United States Patent
Khan et al.

(10) Patent No.: US 9,611,940 B2
(45) Date of Patent: Apr. 4, 2017

(54) GATE VALVE

(71) Applicant: NIPPON VALQUA INDUSTRIES, LTD., Tokyo (JP)

(72) Inventors: Maksud Uddin Khan, Gojo (JP); Tsutomu Yoshida, Gojo (JP)

(73) Assignee: NIPPON VALQUA INDUSTRIES, LTD., Tokyo (JP)

( * ) Notice: Subject to any disclaimer, the term of this patent is extended or adjusted under 35 U.S.C. 154(b) by 125 days.

(21) Appl. No.: 14/360,129

(22) PCT Filed: Nov. 1, 2012

(86) PCT No.: PCT/JP2012/078322
§ 371 (c)(1),
(2) Date: May 22, 2014

(87) PCT Pub. No.: WO2013/077164
PCT Pub. Date: May 30, 2013

(65) Prior Publication Data
US 2015/0176713 A1    Jun. 25, 2015

(30) Foreign Application Priority Data
Nov. 25, 2011 (JP) .................................. 2011-257572

(51) Int. Cl.
F16K 51/02 (2006.01)
F16K 3/02 (2006.01)

(52) U.S. Cl.
CPC ............ F16K 3/0227 (2013.01); F16K 51/02 (2013.01)

(58) Field of Classification Search
CPC ............................... F16K 3/0227; F16K 51/02
(Continued)

(56) References Cited

U.S. PATENT DOCUMENTS 4,208,035 A * 6/1980 Alvarez ................. F16K 3/205
251/196
6,089,543 A    7/2000 Freerks
(Continued)

FOREIGN PATENT DOCUMENTS

JP    07-002742    1/1995
JP    8-219290    8/1996
(Continued)

OTHER PUBLICATIONS

Machine Translation of WO2010032722 (A1), Hamade et al., Mar. 25, 2010.*

(Continued)

*Primary Examiner* — Kevin Murphy
*Assistant Examiner* — Paul J Gray
(74) *Attorney, Agent, or Firm* — Westerman, Hattori, Daniels & Adrian, LLP

(57) ABSTRACT

A gate valve is provided with a main body, and a sealing member which comes into contact with the peripheral edge of a gate when the gate valve is closed. The sealing member includes a protruding first section and a protruding second section which are disposed to extend along the peripheral edge of the main body and protrude from the primary surface when the gate valve is open. A protrusion amount of the first section from the primary surface is greater than a protrusion amount of the second section from the primary surface. The first section is disposed inner to the inner periphery of the primary surface than the second section.

5 Claims, 4 Drawing Sheets

(58) Field of Classification Search
USPC .......................................... 251/326, 328, 332
See application file for complete search history.

(56) References Cited

U.S. PATENT DOCUMENTS

| | | | | |
|---|---|---|---|---|
| 2005/0225039 | A1* | 10/2005 | Seki | .................. F16J 15/061 |
| | | | | 277/637 |
| 2008/0073605 | A1 | 3/2008 | Ishigaki et al. | |
| 2009/0108544 | A1* | 4/2009 | Sico | ..................... F16K 3/06 |
| | | | | 277/631 |
| 2009/0250649 | A1 | 10/2009 | Tsuji | |
| 2011/0169229 | A1 | 7/2011 | Hamade et al. | |

FOREIGN PATENT DOCUMENTS

| | | | |
|---|---|---|---|
| JP | | 2004-286067 | 10/2004 |
| JP | | 2006-220229 | 8/2006 |
| JP | | 2008-075827 | 4/2008 |
| JP | | 2009-293740 | 12/2009 |
| JP | | 2010-038308 | 2/2010 |
| JP | WO | 2010032722 A1 * | 3/2010 ............. F16J 15/104 |
| JP | | 2010-151210 | 7/2010 |
| JP | | 2011-231908 | 11/2011 |
| KR | | 10-2001-0021748 A | 3/2001 |
| KR | | 20110061614 A | 6/2011 |
| WO | | 2008/001683 | 1/2008 |
| WO | | 2008/120349 | 10/2008 |
| WO | | 2009/107495 | 9/2009 |
| WO | | 2010/032722 | 3/2010 |

OTHER PUBLICATIONS

Decision to Grant for related JP 2011-257572, dated Dec. 4, 2012, and English translation thereof.

International Search Report for PCT/JP2012/078322, dated Dec. 11, 2012.

Korean Office Action dated Sep. 14, 2015 issued in counterpart Korean patent application No. 10-2014-7015919, with English translation, (9 pages).

Notice of Allowance dated Sep. 29, 2016, issued in counterpart Korean Patent Application No. 10-2014-7015919, with English translation. (3 pages).

* cited by examiner

FIG.3
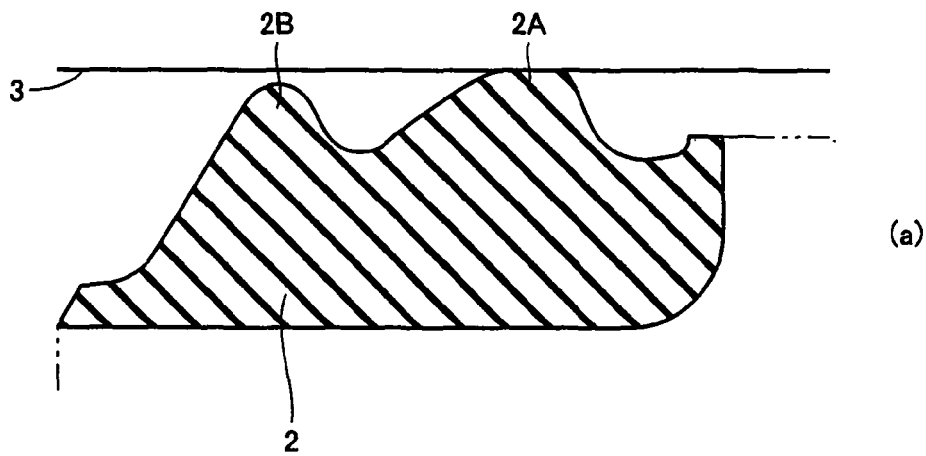
(a)
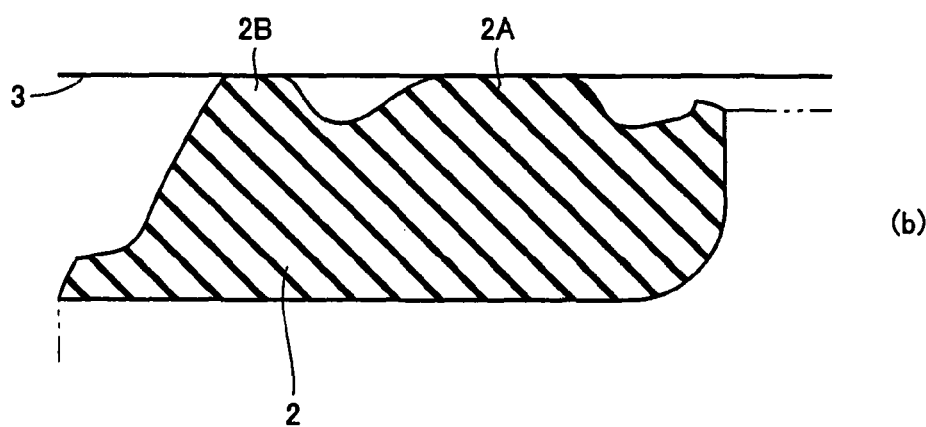
(b)
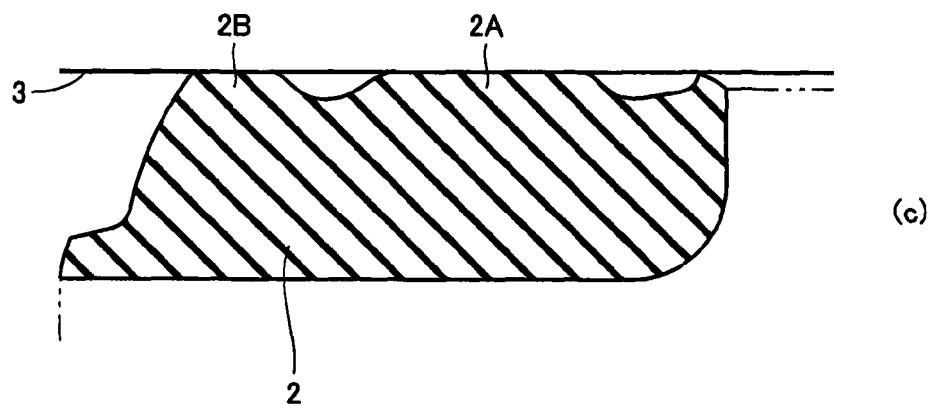
(c)

GATE VALVE

TECHNICAL FIELD

The present invention relates to a gate valve, and particularly to a gate valve used in a semiconductor manufacturing apparatus or the like and provided to a gate allowing a wafer to enter or leave a chamber.

BACKGROUND ART

As a vacuum gate valve used in a semiconductor manufacturing apparatus, for example, those described in WO 2008/001683 (PTD 1) and WO 2010/032722 (PTD 2) are known conventionally.

CITATION LIST

Patent Document

PTD 1: WO 2008/001683
PTD 2: WO 2010/032722

SUMMARY OF INVENTION

Technical Problem

For example, when performing various processes in the manufacturing procedure of a semiconductor in a chamber of the semiconductor manufacturing apparatus, the chamber may be set to a super-vacuum state or to a high-pressure state.

A gate valve for opening or closing a gate allowing a workpiece such as a wafer to enter or leave is closed with a substantially constant load. However, when the chamber is in a super-vacuum state (under positive pressure), an extra load resulted from the difference between the inner and outer pressures of the chamber acts on the gate valve in the valve-closing direction. On the contrary, when the chamber is in a high-pressure state (under back pressure), a load resulted from the difference between the inner and outer pressures of the chamber acts on the gate valve in the valve-opening direction, decreasing the force for closing the gate valve.

The bigger the workpiece such as a wafer is, the larger the opening of the gate will be, and thereby, the above tendency will become more remarkable. Specifically, the difference between the loads acting on a sealing member of the gate valve under the positive pressure and the back pressure respectively becomes greater.

If the closing force of the gate valve is large and thereby the sealing member deforms excessively, it is concerned that a main body of the gate valve may come into contact with the gate, leading to the generation of undesired particles. On the other hand, if the closing force of the gate valve is small and thereby the sealing member deforms insufficiently, it is concerned that the air tightness may not be secured as predetermined.

In the abovementioned situations, when the load is high under positive pressure, it is required to suppress the deformation of the sealing member so as to prevent the main body of the gate valve from contacting the gate, and when the load is low under back pressure, it is required to make the sealing member deform easily to some extent so as to secure the air tightness as predetermined.

Particularly when the load is high under the positive pressure time, the sealing member is required to be prevented from falling down to the outer peripheral side, which otherwise results in the generation of undesired particles.

The vacuum gate valve described in PTD 1 or PTD 2 is not fabricated to satisfy the requirements described above, and thereby does not possess a configuration for sufficiently solving the problems described above.

Specifically, the gate valve described in PTD 1 is configured for the purpose of preventing a stress force from getting concentrated or an adhesive agent from getting detached and thereby preventing cracks from occurring in the sealing member or preventing the generation of particles, and thus, it is irrelevant to the present invention considering the variation of a load acting on the sealing member.

The gate valve described in PTD 2 is configured for the purpose of preventing the sealing member from being exposed to a treating gas, and thus, it is irrelevant to the present invention considering the variation of a load acting on the sealing member.

The present invention has been accomplished in view of the aforementioned problems, and it is therefore an object of the present invention to provide a gate valve capable of securing the air tightness as predetermined while preventing a main body of the gate valve from contacting a gate thereof even though a load acting on the sealing member varies.

Solution to Problem

A gate valve according to the present invention is provided to a gate allowing a workpiece to enter or leave a chamber and includes a main body which has a primary surface, and a sealing member which comes into contact with the peripheral edge of the gate when the gate valve is closed. The sealing member includes a protruding first section and a protruding second section which are disposed to extend along the peripheral edge of the main body and protrude from the primary surface when the gate valve is open. It should be noted that "extend along the peripheral edge of the main body" includes such a case that a part of the first section and the second section may deviate from the peripheral edge of the main body or approach closer to the peripheral edge of the main body but the major part thereof is formed along the peripheral edge of the main body.

In the gate valve according to the present invention, a protrusion amount of the first section from the primary surface is greater than a protrusion amount of the second section from the primary surface. In addition, the first section is disposed inner to the inner periphery of the primary surface than the second section.

In one aspect of the gate valve, the second section comes into contact with the peripheral edge of the gate only when the gate valve is closed with a relatively high load.

In one aspect of the gate valve, an inclination angle of an outer peripheral sloping surface of the second section relative to the primary surface of the main body is greater than an inclination angle of an outer peripheral sloping surface of the first section relative to the primary surface of the main body.

In one aspect of the gate valve, the inclination angle of the outer peripheral sloping surface of the first section relative to the primary surface of the main body is smaller than an inclination angle of an inner peripheral sloping surface of the first section relative to the primary surface of the main body.

Advantageous Effects of Invention

According to the present invention, when the load is high, the load is received by both the first section and the second section of the sealing member and thereby, the deformation of the sealing portion is suppressed; when the load is low, the load is received by the first section of the sealing member only and thereby, it is easy for the sealing member to deform. Therefore, even though the load acting on the sealing portion of the gate valve varies, it is possible to prevent the main body of the gate valve from contacting the gate when the load is high and to secure the air tightness as predetermined when the load is low.

According to the present invention, since the first section having a greater protrusion amount is located inner to the inner periphery, the sealing member is prevented from deforming by falling down toward the outer periphery when the load is high, and thereby, it is possible to prevent the generation of particles caused by the deformation.

BRIEF DESCRIPTION OF DRAWINGS

FIG. 3 includes views illustrating the usage state of the gate valve illustrated in FIG. 1, in which (a) shows the usage state under a low load (back pressure), (b) shows the usage state under a medium load (equal pressure), (c) shows the usage state under a high load (positive pressure)

DESCRIPTION OF EMBODIMENTS

An embodiment of the present invention will be described hereinafter. It should be noted that the same or equivalent portions will be given the same reference marks and the description thereof may not be repeated.

It should be noted that unless otherwise specified, the scope of the present invention is not limited to the number, the quantity or the like cited in the embodiment to be described below. In the following embodiment, unless otherwise specified, each component is not necessarily essential to the present invention.

Figure 1:
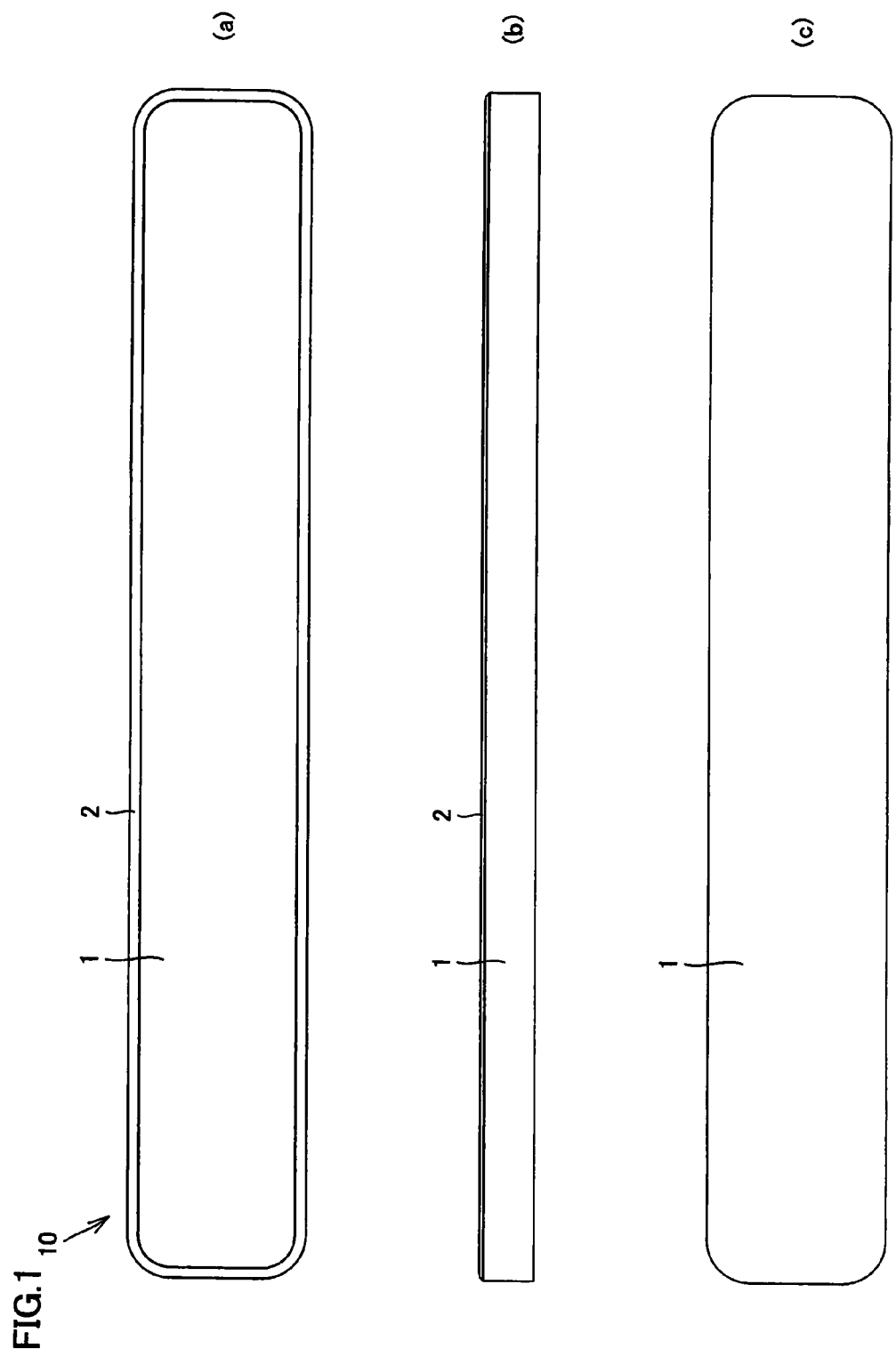
FIG. 1 includes views illustrating a gate valve according to one embodiment of the present invention, in which (a) is a front view, (b) is a bottom view, and (c) is a rear view.

FIG. 1 includes views illustrating a gate valve according to the present embodiment, in which (a) is a front view, (b) is a bottom view and (c) is a rear view. In the present specification, a gate opening and a side facing the inside space of a chamber is set as the front of the gate valve.

Typically, a gate valve 10 according to the present embodiment is provided to a gate of a semiconductor manufacturing apparatus. The gate is an opening allowing a workpiece such as a wafer to enter or leave the chamber.

Gate valve 10 according to the present embodiment may be provided to a gate between a process chamber and a transfer chamber, or may be provided to a gate between the transfer chamber and a load lock chamber, or may be provided to a gate between the load lock chamber and an air releasing member.

As illustrated in FIGS. 1(a), 1(b) and 1(c), gate valve 10 according to the present embodiment is provided with a main body 1, a sealing member 2 disposed on a primary surface of main body 1.

Main body 1 is formed from aluminum or the like, for example. Main body 1 is driven to move in the valve-opening direction or in the valve-closing direction by an air cylinder.

Sealing member 2 is formed from an elastic material such as rubber or elastomer. Sealing member 2 is disposed along the peripheral edge of the primary surface of main body 1. When the gate valve is closed, sealing member 2 comes into contact with the peripheral edge around the opening (gate) of a housing which constitutes the chamber. Sealing member 2 may be adhered to main body 1, or may be fit in a groove formed in main body 1.

As an example, the length of gate valve 10 may be about 500 mm. As an example, the width of the gate valve may be about 80 mm. As an example, the height of gate valve 10 (including sealing member 2) may be about 25 mm. The width of sealing member 2 in gate valve 10 may be about 7 mm, for example.

Figure 2:
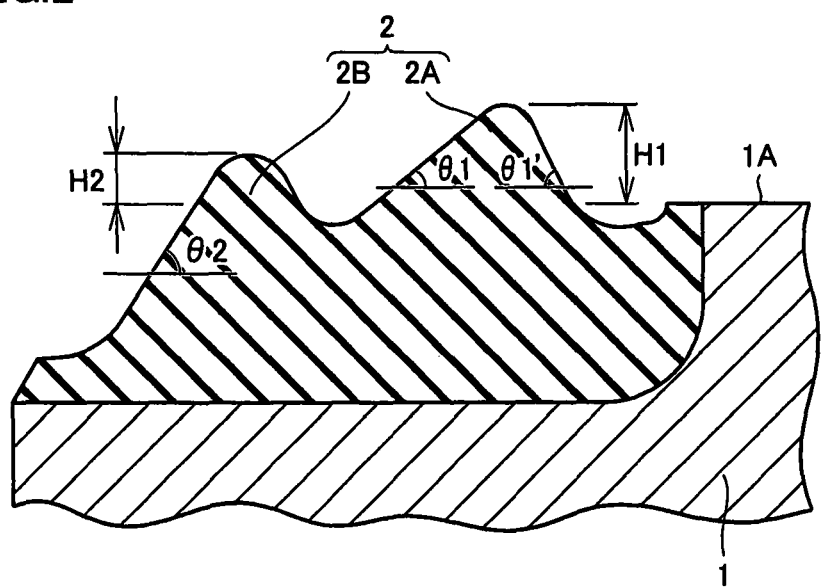
FIG. 2 is an enlarged cross-sectional view illustrating the periphery of a sealing member in the gate valve illustrated in FIG. 1.

Next, the structure of sealing member 2 will be described with reference to FIG. 2 which is an enlarged sectional view illustrating the periphery of sealing member 2 in gate valve 10. FIG. 2 illustrates the state when the gate valve is open.

As illustrated in FIG. 2, sealing member 2 includes a protruding first section 2A protruding from primary surface 1A of main body 1 and a protruding second section 2B protruding from primary surface 1A of main body 1 as well when the gate valve is open. First section 2A is disposed inner to the inner periphery of primary surface 1A of main body 1 than second section 2B.

As an example, the height (total height) of sealing member 2 may be about 3 mm. As an example, a protrusion amount H1 of first section 2A from primary surface 1A may be about 1 mm. As an example, a protrusion amount H2 of second section 2B from primary surface 1A may be about 0.5 to 0.6 mm. In other words, protrusion amount H1 of first section 2A from primary surface 1A of main body 1 is greater than protrusion amount H2 of second section 2B from primary surface 1A of main body 1.

As an example, an inclination angle θ1 of an outer peripheral sloping surface of first section 2A relative to primary surface 1A of main body 1 may be about 39°. As an example, an inclination angle θ1' of an inner peripheral sloping surface of first section 2A relative to primary surface 1A of main body 1 may be about 64°. As an example, an inclination angle θ2 of an outer peripheral sloping surface of second section 2B relative to primary surface 1A of main body 1 may be about 57° to 67°.

In other words, inclination angle θ2 of the outer peripheral sloping surface of second section 2B relative to primary surface 1A of main body 1 is greater than inclination angle θ1 of the outer peripheral sloping surface of first section 2A relative to the primary surface 1A of main body 1. Inclination angle θ1 of the outer peripheral sloping surface of first section 2A relative to primary surface 1A of main body 1 is smaller than inclination angle θ1' of the inner peripheral sloping surface of first section 2A relative to primary surface 1A of main body 1.

Next, the usage state of gate valve 10 will be described with reference to FIG. 3. FIG. 3(a) illustrates a case where the load acting on sealing member 2 is low, FIG. 3(b) illustrates a case where the load acting on sealing member 2 is medium, and FIG. 3(c) illustrates a case where the load acting on sealing member 2 is high.

When gate valve 10 is closed, main body 1 is driven by a substantially constant load. However, when the chamber is in a super-vacuum state (under positive pressure), an extra load resulted from the difference between the inner and outer pressures of the chamber acts on sealing member 2 in the valve-closing direction of the gate valve. On the contrary, when the chamber is in a high-pressure state (under back pressure), a load resulted from the difference between the inner and outer pressures of the chamber acts on sealing member 2 in the valve-opening direction of the gate valve. When there is no difference between the inner and outer pressures of the chamber (under equal pressure), the load for driving main body 1 in the valve-closing direction acts on sealing member 2. Thus, the load acting on sealing member 2 varies as mentioned above.

As an example, a low load acting on sealing member 2 (under back pressure) may be about 2000 N. As an example, a high load acting on sealing member 2 (under positive pressure) may be about 8000 N. As an example, a medium load acting on sealing member 2 (under equal pressure) may be about 5000 N.

As illustrated in FIG. 3(a), when the load acting on sealing member 2 (under back pressure) is low, only first section 2A comes into contact with a contact surface 3 of the gate. As illustrated in FIG. 3(b) and FIG. 3(c), when the load acting on sealing member 2 is medium (under equal pressure) and when the load acting on sealing member 2 is high (under positive pressure), both first section 2A and second section 2B come into contact with contact surface 3 of the gate. In other words, second section 2B is configured to come into contact with contact surface 3 of the gate only when gate valve 10 is closed by a relatively high load.

Although in the example of the present embodiment, second section 2B is described to come into contact with contact surface 3 of the gate when the load acting on sealing member 2 is medium (under equal pressure), second section 2B may be configured to come into contact with contact surface 3 of the gate only when the load acting on sealing member 2 is high (under positive pressure).

According to gate valve 10 of the present embodiment, when the load is low, as illustrated in FIG. 3(a), the load is received by only first section 2A of sealing member 2, and thereby sealing member 2 is easy to deform. On the other hand, when the load is high, as illustrated in FIG. 3(c), the load is received by both first section 2A and second section 2B of sealing member 2, the deformation of sealing member 2 is suppressed.

As mentioned, according to gate valve 10 of the present embodiment, even though the load acting on sealing member 2 varies, it is possible to prevent sealing member 2 from deforming excessively and thereby prevent main body 1 from coming into contact with the gate when the load is high, and meanwhile secure the air tightness as predetermined when the load is low.

Figure 4:
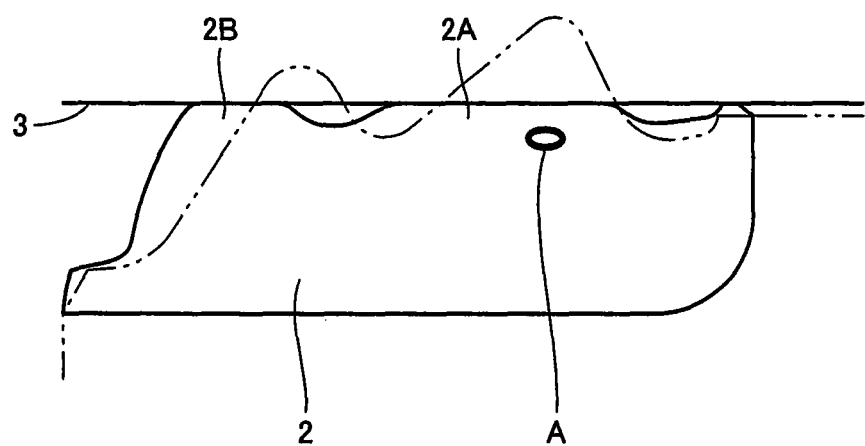
FIG. 4 is a view illustrating the state of stress when a high load is applied to the gate valve illustrated in FIG. 1.

In gate valve 10 according to the present embodiment, as illustrated in FIG. 4, by disposing first section 2A having a greater protrusion amount inner to the inner periphery than second section 2B, it is possible to locate a peak of stress (denoted by A in FIG. 4) at a point relatively to the inner periphery of sealing member 2 when the load is high. As a result, even when the load is high, it is possible to suppress the deformation of sealing member 2 by falling down toward the outer periphery, and thereby, it is possible to prevent the generation of particles resulted from the deformation.

In gate valve 10 according to the present embodiment, by setting inclination angle θ2 of the outer peripheral sloping surface of second section 2B greater than inclination angle θ1 of the outer peripheral sloping surface of first section 2A, it is possible to make second section 2B, which comes into contact with the gate only when the load is high, relatively hard to deform and make first section 2A, which comes into contact with the gate when the load is low, relatively easy to deform. As a result, it is possible to further enhance such effect that it is hard for sealing member 2 to deform when the load is high and easy for sealing member 2 to deform when the load is low.

In gate valve 10 according to the present embodiment, by setting inclination angle θ1 of the outer peripheral sloping surface of first section 2A smaller than inclination angle θ1' of the inner peripheral sloping surface of first section 2A, it is possible to locate the peak of stress (denoted by A in FIG. 4) at a point further toward the inner periphery of sealing member 2 when the load is high. As a result, it is possible to further enhance the effect of suppressing the deformation of sealing member 2 by falling down toward the outer periphery.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

INDUSTRIAL APPLICABILITY

The gate valve of the present invention is applicable to a gate for a workpiece to enter or leave a chamber in a semiconductor manufacturing apparatus or the like.

REFERENCE SIGNS LIST

1: main body; 1A: primary surface; 2: sealing member; 2A: first section (main sealer); 2B: second section (squeeze adjuster); 3: contact surface

The invention claimed is:

1. A gate valve provided to a gate allowing a workpiece to enter or leave a chamber, comprising:
   a main body which has a primary surface; and
   a sealing member which comes into contact with a peripheral edge of said gate when said gate valve is closed,
   said sealing member including a protruding first section and a protruding second section both which are disposed to extend along a peripheral edge of said main body and protrude from said primary surface when said gate valve is open,
   a protrusion amount of said first section from said primary surface being greater than a protrusion amount of said second section from said primary surface,
   said first section being disposed inwardly from the second section with respect to a peripheral edge of said primary surface, and
   said second section having an outer peripheral sloping surface that slopes down from a top of the protruding amount of said second section towards the peripheral edge of said main body adjacent to said second section.

2. The gate valve according to claim 1, wherein said second section comes into contact with the peripheral edge of said gate only when said gate valve is closed with a relatively high load.

3. The gate valve according to claim 1, wherein an inclination angle of the outer peripheral sloping surface of said second section relative to the primary surface of said main body is greater than an inclination angle of an outer peripheral sloping surface of said first section relative to the primary surface of said main body.

4. The gate valve according to claim 1, wherein the inclination angle of an outer peripheral sloping surface of said first section relative to the primary surface of said main body is smaller than an inclination angle of an inner peripheral sloping surface of said first section relative to the primary surface of said main body.

5. The gate valve according to claim 1, wherein said first portion and said second portion are integrally formed of a single material, and wherein said sealing member has a flat bottom surface at a position corresponding to said first section and said second section.

\* \* \* \* \*